(12) United States Patent
Liwanag

(10) Patent No.: US 12,325,270 B2
(45) Date of Patent: Jun. 10, 2025

(54) VEHICLE ACCESSORY CONNECTABLE TO A VEHICLE

(71) Applicant: Allan Joseph Ayson Liwanag, Upland, CA (US)

(72) Inventor: Allan Joseph Ayson Liwanag, Upland, CA (US)

( * ) Notice: Subject to any disclaimer, the term of this patent is extended or adjusted under 35 U.S.C. 154(b) by 676 days.

(21) Appl. No.: 17/643,413

(22) Filed: Dec. 8, 2021

(65) Prior Publication Data

US 2023/0173858 A1  Jun. 8, 2023

(51) Int. Cl.
| | | |
|---|---|---|
| *B60D 1/52* | (2006.01) | |
| *B60D 1/24* | (2006.01) | |
| *B62D 43/02* | (2006.01) | |

(52) U.S. Cl.
CPC ............... *B60D 1/52* (2013.01); *B60D 1/24* (2013.01); *B62D 43/02* (2013.01)

(58) Field of Classification Search
CPC ............ B60D 1/52; B60D 1/24; B62D 43/02
USPC .............................................. 224/42.21, 502
See application file for complete search history.

(56) References Cited

U.S. PATENT DOCUMENTS

| | | | | |
|---|---|---|---|---|
| 1,603,617 A * | 10/1926 | Thomas | ................. | B62D 43/02 224/42.12 |
| 3,194,467 A * | 7/1965 | Goonan | ................. | B23K 13/00 269/48.1 |
| 5,094,373 A * | 3/1992 | Lovci | .................... | B62D 43/02 224/535 |
| 5,333,888 A * | 8/1994 | Ball | ........................ | B60D 1/52 280/506 |
| 5,544,799 A * | 8/1996 | Didlake | .................... | B60R 9/06 224/523 |
| 5,664,717 A * | 9/1997 | Joder | ........................ | B60R 9/06 224/532 |
| 6,189,748 B1 * | 2/2001 | Hutter | .................. | B62D 43/002 224/42.28 |
| 6,199,735 B1 * | 3/2001 | Cothern | .................... | B60R 9/10 224/509 |

(Continued)

FOREIGN PATENT DOCUMENTS

GB          2424506 A  *  9/2006  ............. B60R 13/00

OTHER PUBLICATIONS

PCT/US2021/072816 International Search Report and Written Opinion of the International Searching Authority dated Sep. 26, 2022, 17 pages.

*Primary Examiner* — Nathan J Newhouse
*Assistant Examiner* — Lester L Vanterpool
(74) *Attorney, Agent, or Firm* — Boisbrun Hofman, PLLC

(57) ABSTRACT

A vehicle accessory connectable to a vehicle. The vehicle accessory may include sequences of dots and dashes represents letters of the alphabet. The vehicle accessory may be a carrier for carrying an object. The carrier may include a hitch connector operable to be inserted into a hitch receiver, a first arm, a second arm, and a pivot joint connecting the first and second arms. The carrier may include a collar disposed in association with the pivot joint and a protrusion disposed in association with the collar. The carrier may include a support bracket whose vertical position along the first arm is adjustable. The hitch connector may include a bar, a wedge, a threaded rod extending away from the bar and through the wedge, and a threaded member configured to move axially along the threaded rod forcing the wedge to slide diagonally along the bar.

8 Claims, 8 Drawing Sheets

(56) References Cited

U.S. PATENT DOCUMENTS

| | | | | |
|---|---|---|---|---|
| 6,237,823 | B1 * | 5/2001 | Stewart | B60R 9/065 224/523 |
| 6,386,410 | B1 * | 5/2002 | Van Dusen | B60R 9/06 224/535 |
| 6,701,913 | B1 * | 3/2004 | LeDuc | B60R 9/06 126/30 |
| 6,835,021 | B1 * | 12/2004 | McMillan | B60D 1/52 280/506 |
| 7,347,017 | B2 * | 3/2008 | Shaffer, Jr. | G09F 21/048 40/606.03 |
| 8,262,121 | B2 * | 9/2012 | Beck | B60D 1/52 280/506 |
| 8,419,041 | B2 * | 4/2013 | Bessette | B60D 1/52 280/506 |
| 9,381,868 | B2 * | 7/2016 | Anyan | B60R 9/10 |
| 9,421,836 | B1 * | 8/2016 | Ford | B60D 1/30 |
| 9,475,353 | B2 * | 10/2016 | Mehlen | B60R 9/065 |
| 9,586,450 | B2 * | 3/2017 | Ford | B60D 1/30 |
| 10,328,862 | B2 * | 6/2019 | Eichmann | B60D 1/42 |
| 10,384,621 | B2 * | 8/2019 | Mehlen | B60R 9/10 |
| 10,415,199 | B2 * | 9/2019 | Smothers | F04D 29/605 |
| 10,479,284 | B1 * | 11/2019 | Salyer | B60R 9/06 |
| 10,611,313 | B2 * | 4/2020 | Westcott | A47J 37/0704 |
| 10,752,066 | B2 * | 8/2020 | Rodriguez | B60D 1/1675 |
| 11,220,303 | B2 * | 1/2022 | Wronski | B62D 43/02 |
| 11,702,014 | B2 * | 7/2023 | Wronski | B60R 9/06 224/509 |
| 11,772,569 | B2 * | 10/2023 | Huang | F16B 2/20 224/519 |
| 11,858,404 | B2 * | 1/2024 | Christian | B66F 7/28 |
| 2007/0176447 | A1 * | 8/2007 | Storer | B60R 13/00 296/3 |
| 2009/0001109 | A1 * | 1/2009 | Wilkins | B60D 1/58 224/42.21 |
| 2010/0066069 | A1 * | 3/2010 | Bradshaw | B60R 9/06 280/769 |
| 2010/0264187 | A1 * | 10/2010 | Buskirk | B60R 9/06 224/42.21 |
| 2012/0111910 | A1 * | 5/2012 | Sautter | B60R 9/055 224/309 |
| 2012/0305612 | A1 * | 12/2012 | Bell, Jr. | B60R 9/06 224/519 |
| 2016/0129847 | A1 | 5/2016 | Mehlen | |
| 2020/0047679 | A1 * | 2/2020 | Westcott | B60R 9/06 |
| 2020/0130440 | A1 * | 4/2020 | Fuller | B60D 1/24 |
| 2022/0048345 | A1 * | 2/2022 | Oshman | B60R 9/06 |

\* cited by examiner

US 12,325,270 B2

VEHICLE ACCESSORY CONNECTABLE TO A VEHICLE

BACKGROUND OF THE DISCLOSURE

Certain vehicle accessories can be connected (or mounted) to a vehicle via a hitch receiver of the vehicle. Such vehicle accessories may include object (or cargo) carriers (e.g., wagons, trailers, swing-out carriers, etc.), winches, hitch tow bars, ball hitch adapters, shackle hitch adapters, hitch receiver extensions, hitch receiver expanders, and hitch steps. Such vehicle accessories may comprise a hitch connector configured to be inserted into the hitch receiver of the vehicle. A hitch pin hole of the hitch connector is then aligned with a hitch pin hole of the hitch receiver such that a hitch pin can be inserted later through the hitch pin holes to lock the hitch connector within the hitch receiver. A socket wrench with a long extension may be inserted through a front-side opening of a hitch connector bar to rotate a threaded member of the hitch connector and, thus, move a wedge of the hitch connector against a hitch receiver bar to eliminate wobble between the hitch connector and the hitch receiver when the vehicle is driven. However, when the threaded member is rotated to move the wedge, the hitch connector bar is caused to move within the hitch receiver bar thereby misaligning the hitch pin holes and, thus, preventing or making it difficult for the hitch pin to be inserted through the hitch pin holes to lock the hitch connector within the hitch receiver. The hitch pin cannot be inserted through the hitch pin holes first, because the hitch pin would block insertion of the wrench for rotating the threaded member.

Furthermore, certain vehicle accessories, such as swing-out object carriers, comprise an arm operable to carry an object and swing out to thereby permit access to a trunk or permit a lift gate of the vehicle to be opened. When the arm is in a retracted (or closed) position, a support plate may support the weight of the arm and the object carried by the arm to prevent or inhibit the arm from bending, sagging, or oscillating while the vehicle is driven. However, when the object carried by the arm is heavy, the arm may sag below the support plate thereby preventing the arm to be moved to the retracted position. The arm (with the heavy object) has to then be manually lifted onto the support plate.

Furthermore, swing-out object carriers extend away from and laterally along a rear-side of a vehicle, and are therefore susceptible to making contact with objects (e.g., trees, rocks, buildings, etc.) in the environment when the vehicle is driven. A pivot joint of a swing-out object carrier defines an outward-most portion of the swing-out object carrier, and is therefore especially susceptible to making contact with and being damaged by objects in the environment when the vehicle is driven. A damaged pivot joint requires that the swing-out object carrier be disconnected from the vehicle, the arm be disconnected from the rest of the swing-out object carrier, and major repair work to be performed, including welding and replacement of the pivot joint.

Furthermore, swing-out object carriers also require the use of two hands to operate. For example, when moving the arm from a retracted position to an extended position, the arm has to be unlocked from the rest of the swing-out object carrier with one hand and simultaneously pivoted to the extended position with the other hand. To lock the arm in the extended position, one hand has to be used to hold the arm in the extended position in the other hand has to be used to lock the arm in the extended position.

Also, vehicle accessories connected to the vehicle are oftentimes used to showcase visual communications that can be viewed by human pedestrians and drivers of other vehicles looking at such vehicle accessories when the vehicle is driven or parked. Visual communications can include text and/or graphics (e.g., pictures, logos, etc.). Visual communications can include, for example, advertisements and personal messages indicative of, for example, personal interests, memberships, and/or endorsements. However, certain vehicle accessories have limited space for including visual communications.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
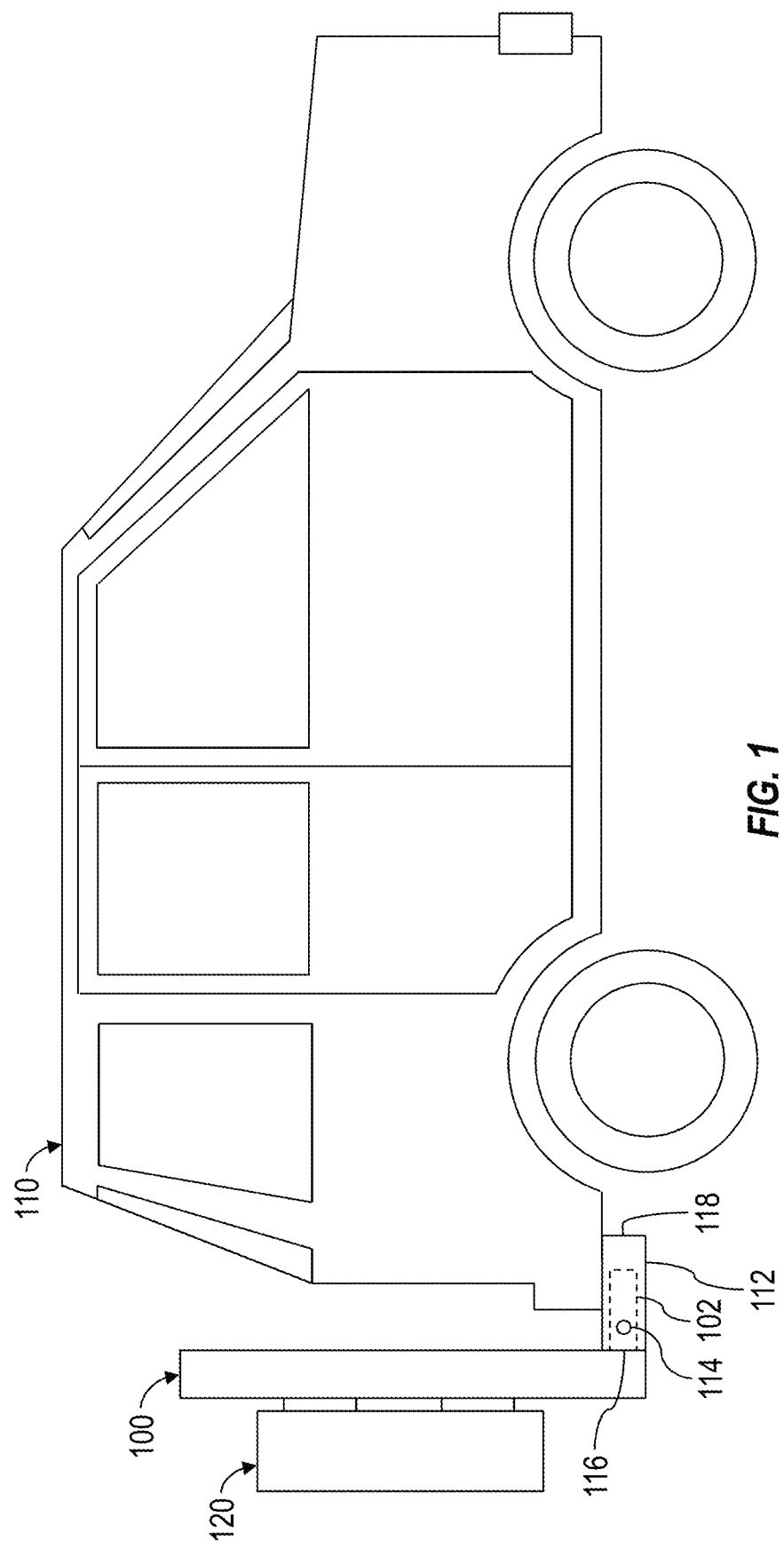
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows, may include embodiments in which the first and second features are formed in direct contact, and may also include embodiments in which additional features may be formed interposing the first and second features, such that the first and second features may not be in direct contact.

Furthermore, terms, such as upper, upward, above, lower, downward, and/or below are utilized herein to indicate relative positions and/or directions between apparatuses, tools, components, parts, portions, members and/or other elements described herein, as shown in the corresponding figures. Such terms do not necessarily indicate relative positions and/or directions when actually implemented. Such terms, however, may indicate relative positions and/or directions with respect to the ground (i.e., the Earth's surface).

FIG. 1 is a schematic view of an example implementation of a vehicle accessory 100 according to one or more aspects of the present disclosure detachably connected to an example vehicle 110 representing an example environment in which the vehicle accessory 100 may be implemented. The vehicle accessory 100 may comprise a tow (or trailer) hitch connector 102 operable to be inserted into a front-side opening 116 of a tow (or trailer) hitch receiver 112 of the vehicle 110. The hitch receiver 112 may also comprise a rear-side opening 118. A hitch receiver pin 114 may be inserted through hitch pin holes of the hitch connector 102 and the hitch receiver 112 to latch, lock, or otherwise retain the hitch connector 102 within the hitch receiver 112 and, thus, detachably connect the vehicle accessory 100 to the vehicle 110. The vehicle accessory 100 may be operable to carry, receive, accommodate, or otherwise detachably connect with an object (or cargo) 120 and, thus, detachably connect the object 120 to the vehicle 100. The object 120 may be or comprise, for example, a spare vehicle tire, a bicycle, a gasoline container, a water container, a food container (e.g., a food cooler), a portable generator, and/or luggage. Therefore, some implementations of the vehicle accessory 100 according to one or more aspects of the present disclosure may be or comprise an object (or cargo) carrier. Other implementations of the vehicle accessory 100 may include, for example, winches, hitch tow bars, ball hitch adapters, shackle hitch adapters, hitch receiver extensions, hitch receiver expanders, and hitch steps.

Figure 2:
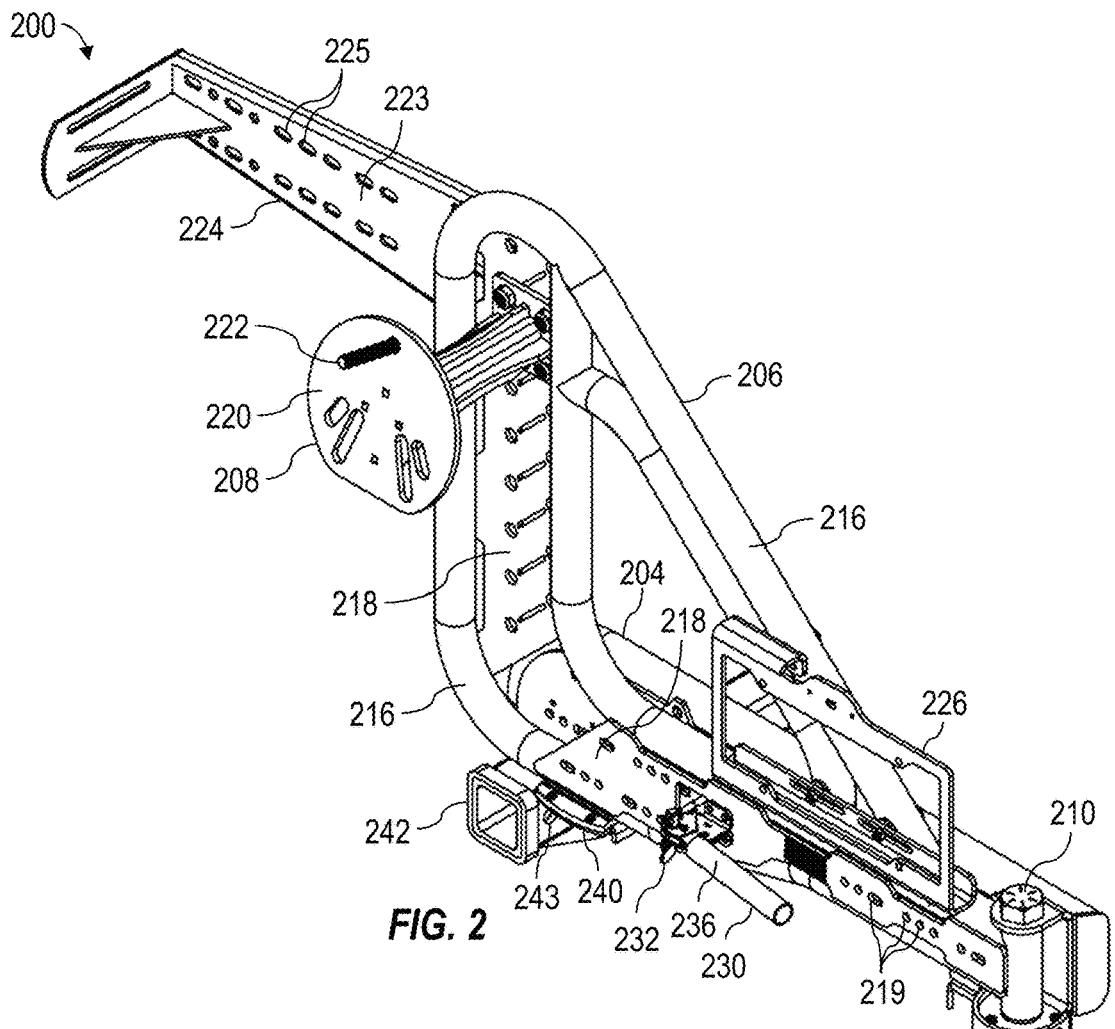
FIG. 2 is a perspective view of at least a portion of an example implementation of apparatus in an operational position according to one or more aspects of the present disclosure.
Figure 3:
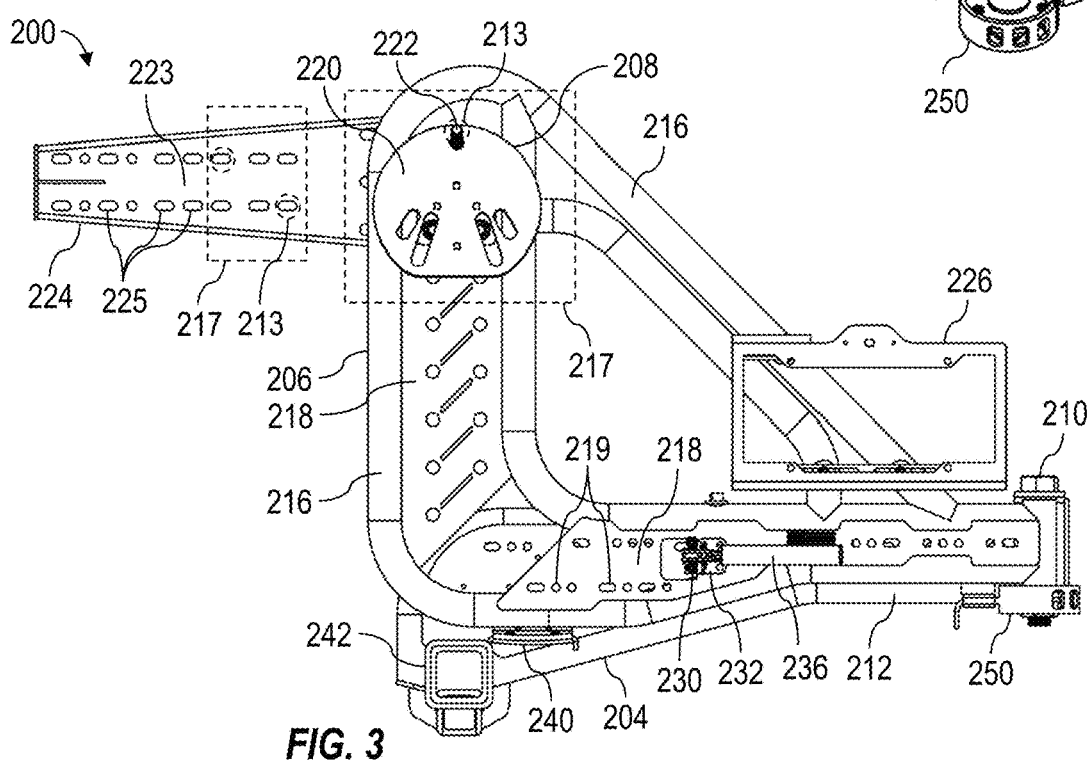
FIG. 3 is a side view of the apparatus shown in FIG. 2.
Figure 4:
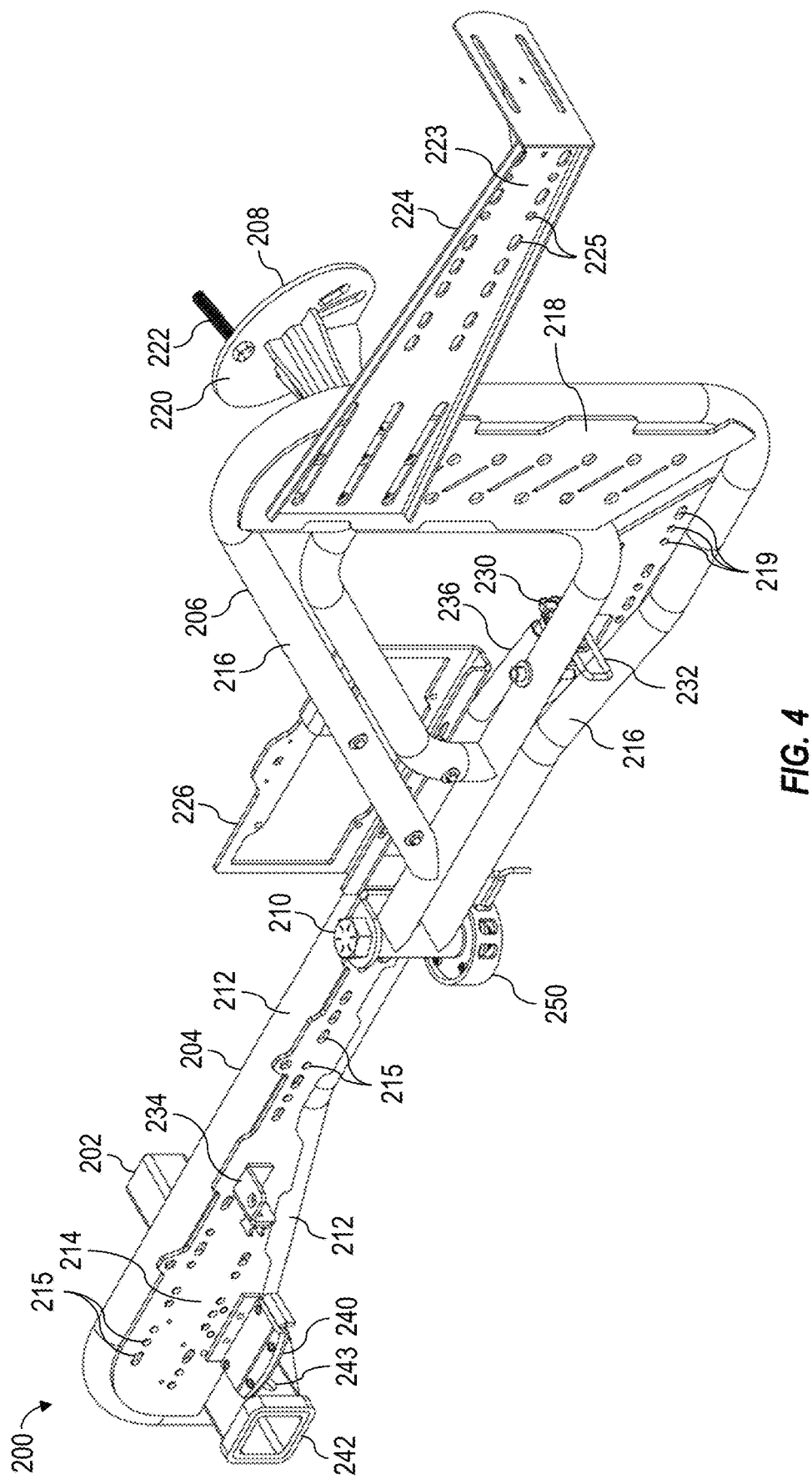
FIG. 4 is a perspective view of at least a portion of the apparatus shown in FIGS. 2 and 3 in a different operational position.
Figure 5:
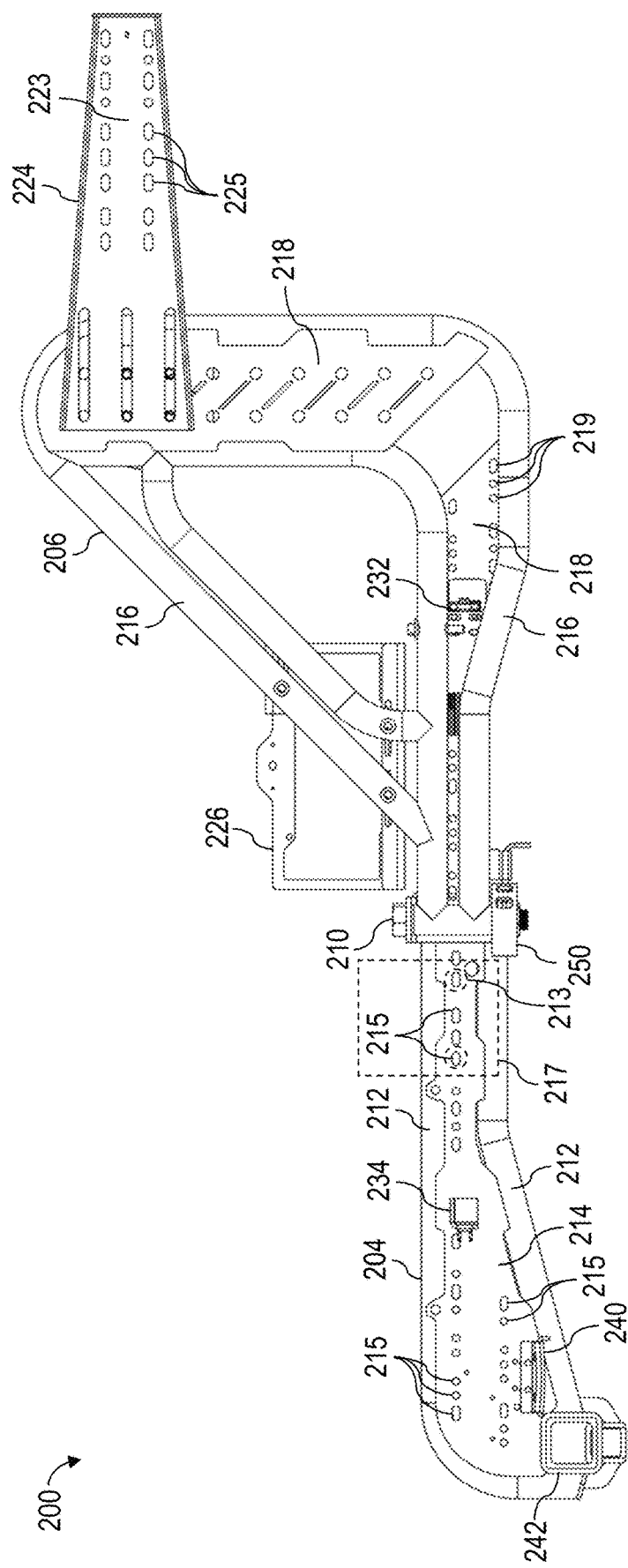
FIG. 5 is a side view of the apparatus shown in FIG. 4.

FIGS. 2-5 are views of an example implementation of a swing-out object carrier assembly 200 (referred to hereinafter as "a carrier assembly") according to one or more aspects of the present disclosure operable to detachably connect with a vehicle and carry, receive, accommodate, or otherwise detachably connect with one or more objects 217 (or accessories) and, thus, detachably connect the objects 217 to the vehicle. The objects 217 may be or comprise, for example, a spare vehicle tire, a bicycle, a gasoline container, a water container, a food container (e.g., a food cooler), a portable generator, and/or luggage. The carrier assembly 200 may be or comprise an example implementation of the vehicle accessory 100 shown in FIG. 1. FIGS. 2 and 3 are perspective and side views, respectively, of the carrier assembly 200 in a retracted position. FIGS. 4 and 5 are perspective and side views, respectively, of the carrier assembly 200 in an extended position. Accordingly, the following description refers to FIGS. 1-5, collectively.

The carrier assembly 200 may comprise a tow (or trailer) hitch connector assembly 202 (referred to hereinafter as "a hitch connector") operable to be inserted into a front-side opening of a tow (or trailer) hitch receiver of the vehicle (referred to hereinafter as "a hitch receiver"). A hitch receiver pin 203 (shown in FIG. 14) may be inserted through hitch pin holes of the hitch connector 202 and the hitch receiver to latch, lock, or otherwise retain the hitch connector 202 within the hitch receiver and, thus, detachably connect the carrier assembly 200 to the vehicle. The carrier assembly 200 may further comprise a first arm assembly 204 (referred to hereinafter as "a first arm") connected to the hitch connector 202, a second arm assembly 206 (referred to hereinafter as "a second arm"), a mounting assembly 208 (referred to hereinafter as "a mount") connected to the second arm 206 and configured for connecting the objects 217 thereto, and a pivot (or hinge) joint assembly 210 (referred to hereinafter as "a pivot joint") pivotably connecting the second arm 206 to the first arm 204.

The first arm 204 may comprise a plurality of structural members 212 (e.g., bars, pipes, beams, etc.) fixedly connected (e.g., welded, bolted, etc.) to the hitch connector 202. The first arm 204 may also comprise one or more mounting surfaces (or plates) 214 fixedly connected to and/or extending between the structural members 212. The mounting surfaces 214 may comprise a plurality of mounting holes (or cavities) 215 configured to accommodate fasteners 213 (e.g., bolts, nuts, clamps, pins, etc.) for connecting the objects 217 to the carrier assembly 200. The fasteners 213 and the objects 217 as shown in phantom lines, indicating that such fasteners 213 and objects 217 are not limited to a particular location of connection, type, size, or shape. Some components of the carrier assembly 200 may be connected to the mounting surfaces 214. The mounting surfaces 214 may be or comprise plates or other structural members configured to facilitate additional structural integrity to the first arm 204, such as to help support the second arm 206 and the objects 217 connected to the mount 208 and/or other portions of the carrier assembly 200. The second arm 206 may comprise a plurality of structural members 216 (e.g., bars, pipes, beams, etc.). The second arm 206 may also comprise one or more mounting surfaces 218 fixedly connected to and/or extending between the structural members 216. The mounting surfaces 218 may comprise a plurality of mounting holes (or cavities) 219 configured to accommodate the fasteners 213 for connecting the objects 217 and/or other accessories to the carrier assembly 200. Components of the carrier assembly 200, such as the mount 208, may be connected to the mounting surfaces 218. The mounting surfaces 218 may be or comprise plates or other structural members configured to facilitate additional structural integrity to the second arm 206, such as to help support the objects 217 connected to the mount 208 and/or other portions of the carrier assembly 200. The mount 208 may be fixedly connected (e.g., welded, bolted, etc.) to the second arm 206. The mount 208 may comprise one or more mounting members configured to connect with, accommodate, or otherwise support the objects 217 connected to the carrier assembly 200. For example, the mount 208 may comprise a mounting (or support) plate 220 configured to contact and/or support the objects 217, and a fastener 222 configured to detachably connect to or otherwise retain the objects 217 against the mounting plate 220. The fastener 222 may be or comprise a threaded bolt. The mount 208 may further comprise a mounting bracket 224 configured to contact and/or support the objects 217. The mounting bracket 224 may comprise one or more mounting surface 223 (or plate) comprising a plurality of mounting holes (or cavities) 225 configured to accommodate the fasteners 213 for connecting the objects 217 and/or other accessories to the carrier assembly 200. The mounting holes 215, 219, 225 may be cut and/or punched into and/or through the corresponding mounting surfaces 214, 218, 223 to form the mounting holes 215, 219, 225. A license plate holder 226 may be connected to the second arm 206 or other portion of the carrier assembly 200.

The structural members 212 of the first arm 204 may be connected to the hitch connector 202 at one end of the first arm 204 and the structural members 212 may be connected to the pivot joint 210 at an opposing end of the arm 204. The structural members 216 of the second arm 206 may be connected to the mount 208 at one end of the second arm 206 and the structural members 216 may be connected to the pivot joint 210 at an opposing end of the second arm 206. The pivot joint 210 may be operable to pivotably connect the second arm 206 to the first arm 204 to permit the second arm 206 to pivot with respect to the first arm 204. The pivot joint 210 may facilitate pivoting movement of the second arm 206 between a retracted (or closed) position, as shown in FIGS. 2 and 3, in which the second arm 206 is disposed against (i.e., is positioned adjacent to or along) the first arm 204 and an extended position, as shown in FIGS. 4 and 5, in which the second arm 206 is disposed at an angle with respect to (i.e., is angled or positioned away from) the first arm 204.

The second arm 206 may be disposed in the retracted position when the vehicle is driven. For example, the carrier assembly 200 may comprise a locking mechanism 230 operable to lock or otherwise maintain the second arm 206 in the retracted position. The locking (or latching) mechanism 230 may comprise a locking (or latching) portion 232 (e.g., a pin, a hook, etc.) connected to the mounting surface 218 or other portion of the second arm 206 and a keeper portion 234 (e.g., a strike, a receptacle, a hook, etc.) connected to the mounting surface 214 or other portion of the first arm 204. When the second arm 206 is in the retracted position against the first arm 204, the locking portion 232 may be aligned with (or disposed against) the keeper portion 234 and then operated to engage the locking portion 232 with the keeper portion 234 to thereby lock the second arm 206 in the retracted position. When the locking portion 232 is aligned with the keeper portion 234, a manual operator 236 (e.g., a lever) of the locking portion 232 may be manually shifted or otherwise operated to engage the locking portion 232 with the keeper portion 234 and, thus, maintain such engagement to thereby maintain the second arm 206 in the retracted position. The operator 236 may be manually operated in an opposing direction to disengage the locking portion 232 from the keeper portion 234 and, thus, permit the second arm 206 to be moved from the retracted position to the extended position.

The carrier assembly 200 may further comprise a support bracket 240 connected to the first arm 204 and operable to support at least a portion of the weight of the second arm 206 and the objects 217 connected to the second arm 206 (e.g., via the mount 208) when the second arm 204 is in the retracted position. The support bracket 240 may be connected to or otherwise supported by the mounting surface 214 or other portion of the first arm 204 at a vertical position (or height) along the first arm 204 such that a structural member 216 or other portion of the second arm 206 contacts (or abuts) the support bracket 240. The support bracket 240 may therefore support a portion of the weight of the second arm 206 and the objects 217 connected to the second arm 206, such as to prevent or inhibit at least a portion of the second arm 206 from bending, sagging, or oscillating, such as when the vehicle is driven.

The carrier assembly 200 may further comprise a hitch receiver extension 242 fixedly connected to the hitch connector 202 and or the second arm 204. The hitch receiver extension 242 may be configured to receive a hitch connector of another vehicle accessory to permit the another vehicle accessory to be detachably connected to the carrier assembly 200 and, thus, detachably connected to the vehicle. A hitch receiver pin (not shown) may be inserted through a bore 243 of the hitch receiver extension 242 and the hitch connector of the another vehicle accessory to latch, lock, or otherwise retain the hitch connector within the hitch receiver extension 242 and, thus, detachably connect the another vehicle accessory to the vehicle.

As described above, the pivot joint 210 may facilitate pivoting movement of the second arm 206 between the retracted position in which the second arm 206 is disposed against the first arm 204 and the extended position in which the second arm 206 is disposed at an angle with respect to the first arm 204. The carrier assembly 200 may further comprise a locking (or latching) mechanism 250 operable to lock or otherwise maintain the second arm 206 at different extended (or angular) positions with respect to the first arm 204. The locking mechanism 250 may be disposed in association with the pivot joint 210 or the locking mechanism 250 may be, comprise, or form a portion of the pivot joint 210.

FIGS. 6-9 are top views of the carrier assembly 200 shown in FIGS. 2-5 in different operational positions according to one or more aspects of the present disclosure. The following description refers to FIGS. 1-9, collectively.

Figure 6:
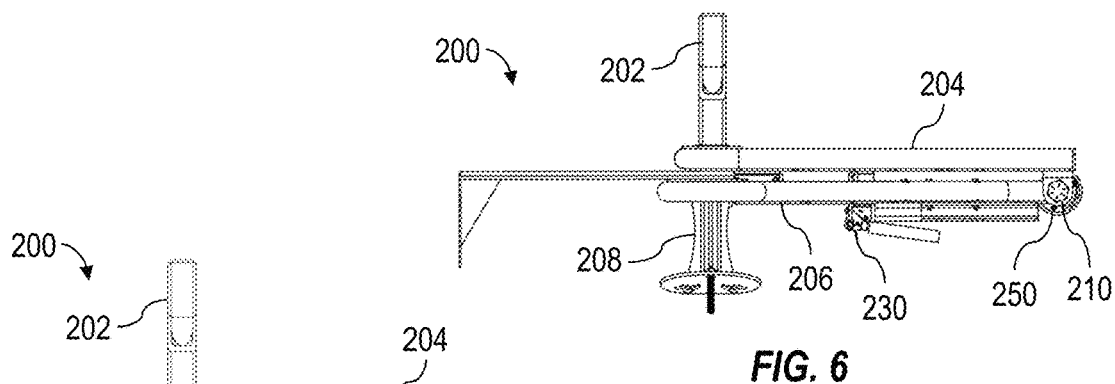
FIGS. 6-9 are top views of the apparatus shown in FIGS. 2-5 in successive operational positions.
Figure 7:
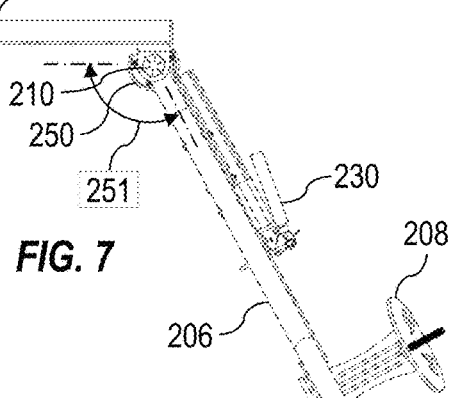
Figure 8:
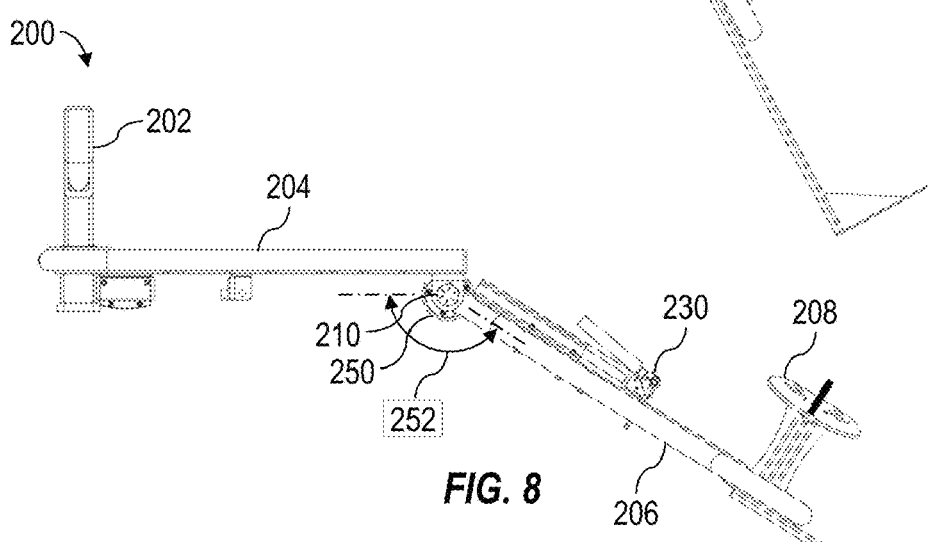
Figure 9:
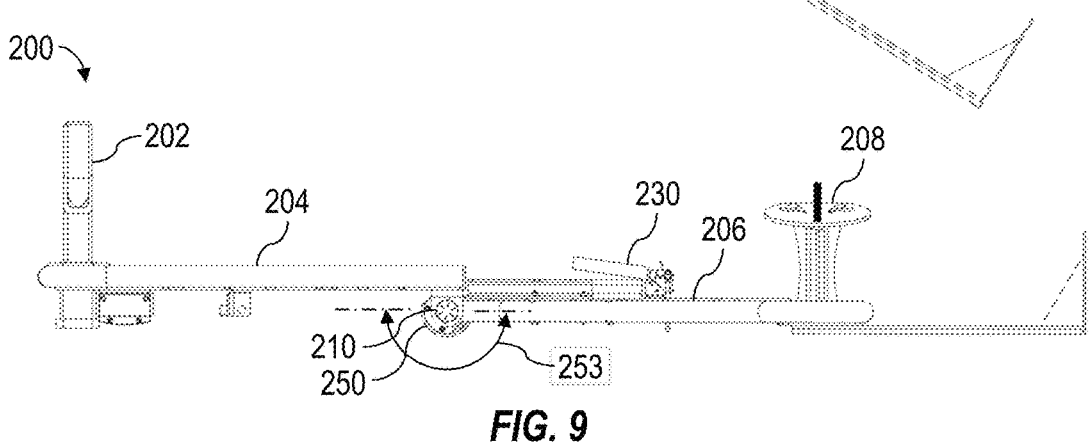

FIG. 6 shows the carrier assembly 200 in the retracted position, with the second arm 206 disposed against the first arm 204. When the second arm 206 is in the retracted position, the angle between the first arm 204 and the second arm 206 may be about zero degrees. FIG. 7 shows the carrier assembly 200 in a first extended position, with the second arm 206 disposed at a first angle 251 with respect to the first arm 204. The locking mechanism 250 may be operable to lock or otherwise maintain the second arm 206 at the first extended position. FIG. 8 shows the carrier assembly 200 in a second extended position, with the second arm 206 disposed at a second angle 252 with respect to the first arm 204. The locking mechanism 250 may be operable to lock or otherwise maintain the second arm 206 at the second extended position. FIG. 9 shows the carrier assembly 200 in a third extended position, with the second arm 206 disposed at a third angle 253 with respect to the first arm 204. The locking mechanism 250 may be operable to lock or otherwise maintain the second arm 206 at the third extended position. Each of the angles 251, 252, 253 may be progressively greater. For example, the first angle 251 one may range between about 90 degrees and about 120 degrees, the second angle 252 may range between about 120 degrees and about 150 degrees, and the third angle 253 may range between about 150 degrees and about 180 degrees.

Figure 10:
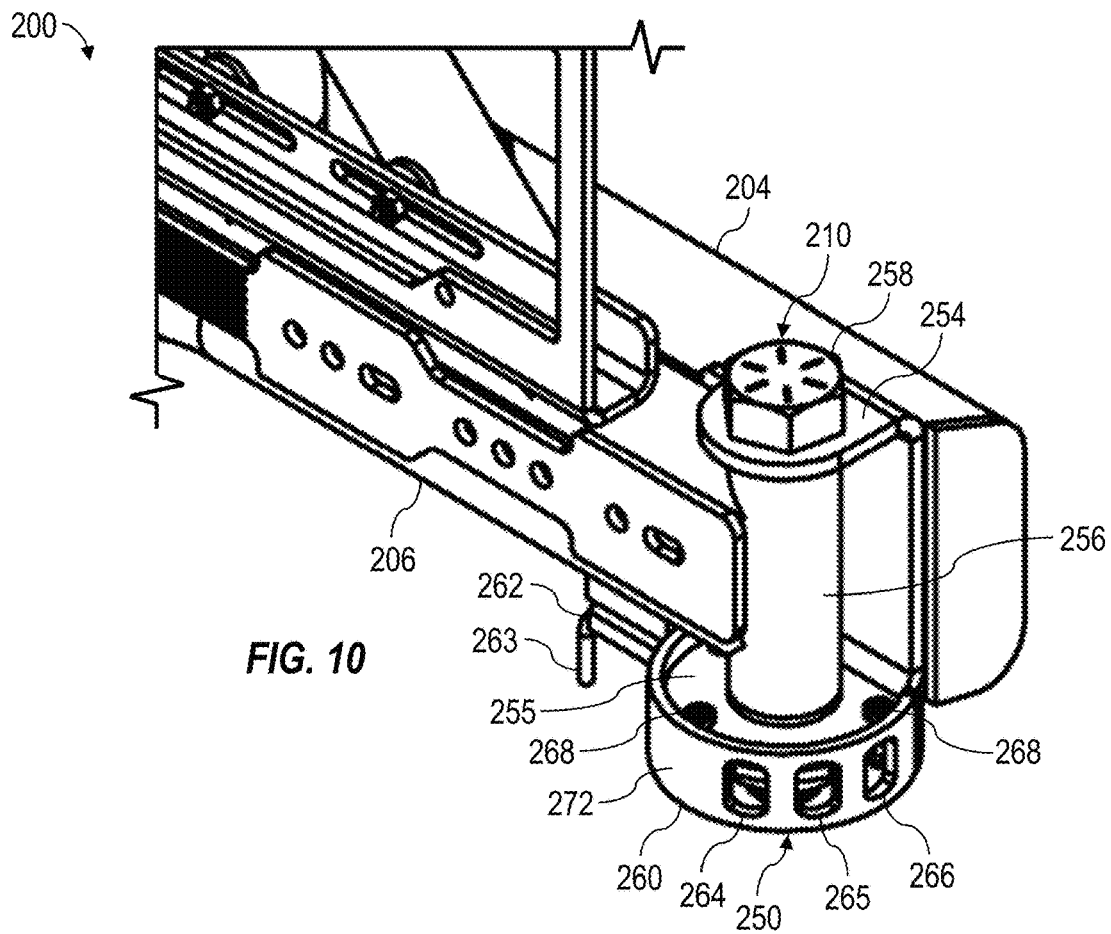
FIG. 10 is an enlarged view of a portion of the apparatus shown in FIG. 2.
Figure 11:
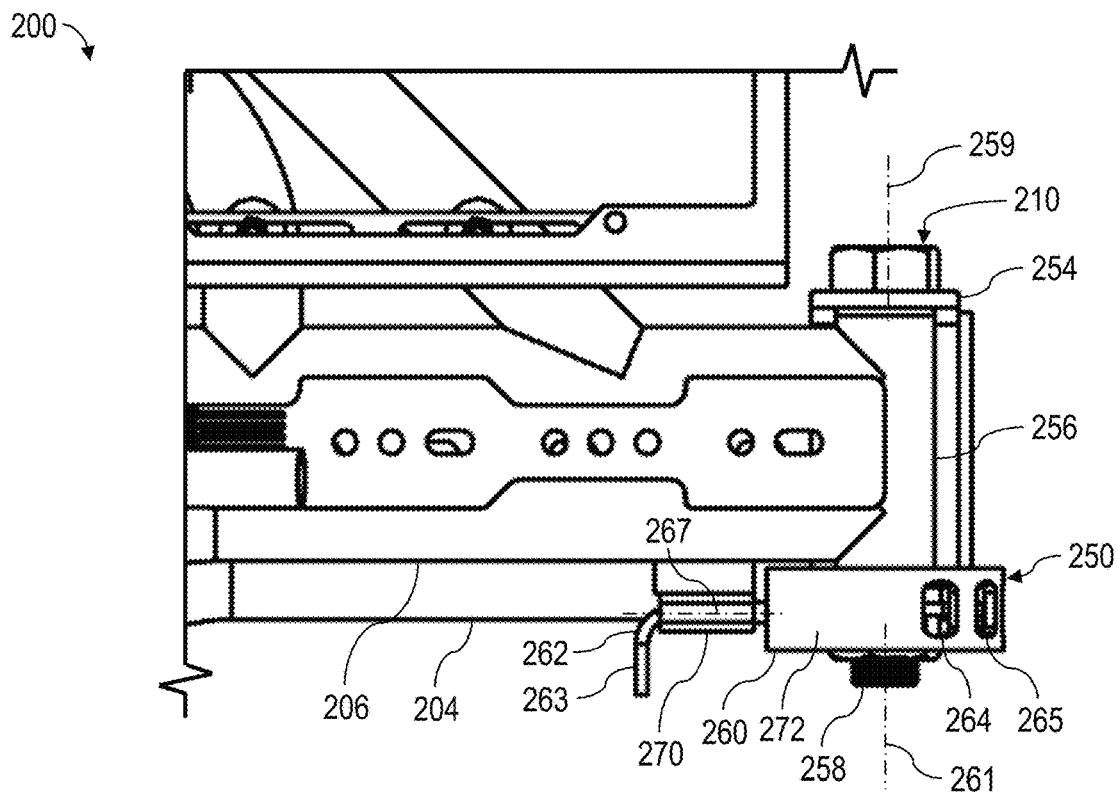
FIG. 11 is an enlarged view of a portion of the apparatus shown in FIG. 3.
Figure 12:
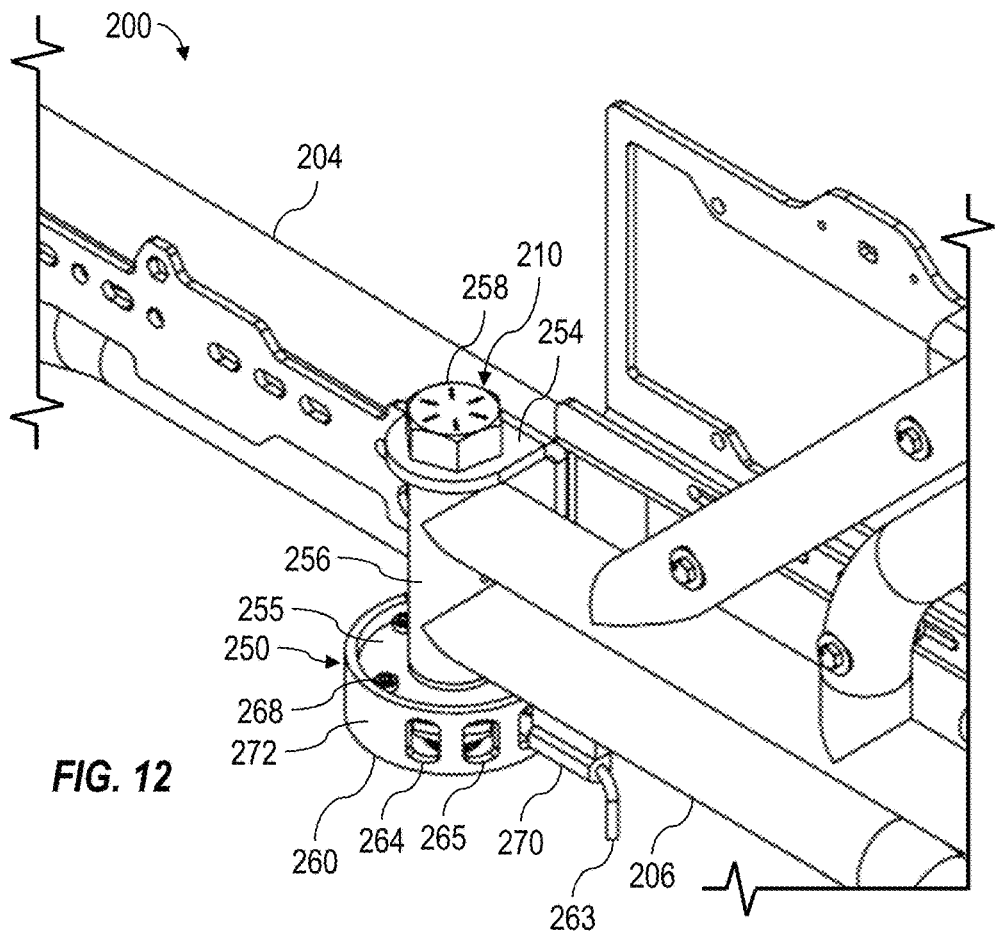
FIG. 12 is an enlarged view of a portion of the apparatus shown in FIG. 4.
Figure 13:
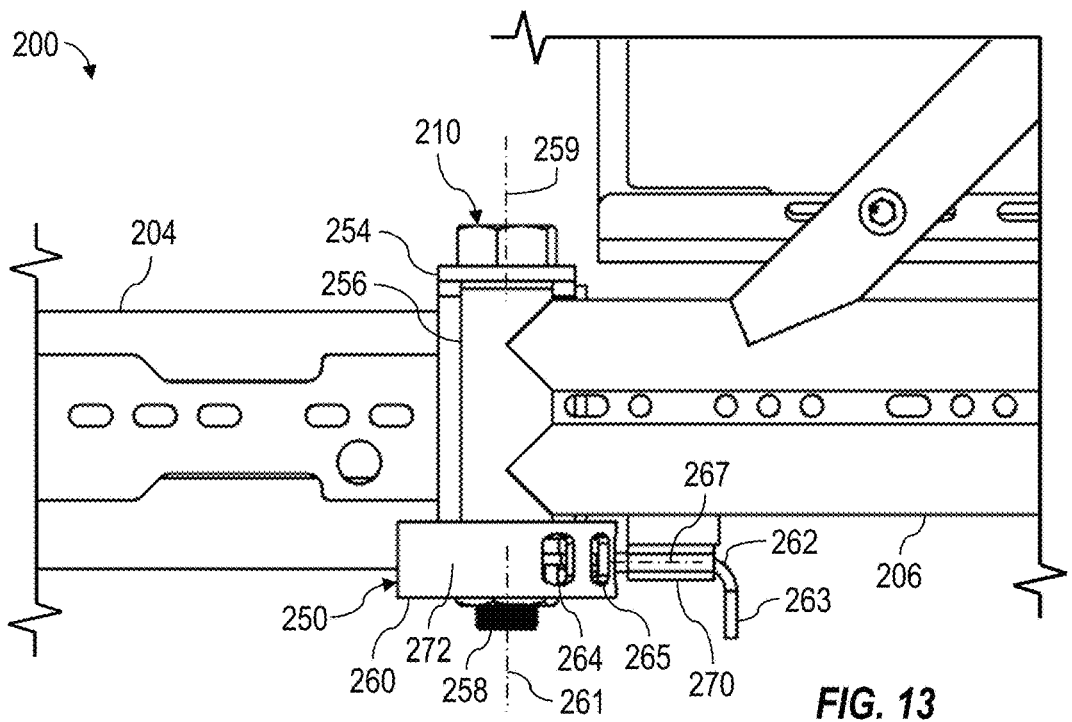
FIG. 13 is an enlarged view of a portion of the apparatus shown in FIG. 5.

FIGS. 10-13 are enlarged views of a portion of the carrier assembly 200, including the pivot joint 210 and the locking mechanism 250 according to one or more aspects of the present disclosure. FIGS. 10 and 11 are enlarged perspective and side views, respectively, of a portion of the carrier assembly 200 in the retracted position, and FIGS. 12 and 13 are enlarged perspective and side views, respectively, of a portion of the carrier assembly 200 in the extended position. The following description refers to FIGS. 1-13, collectively.

The pivot joint 210 may comprise one or more knuckles 254 (e.g., hinges) fixedly connected to the first arm 204, one or more knuckles 256 (e.g., hinges) fixedly connected to the second arm 206, and a pivot pin 258 extending through the knuckles 254, 256 to pivotably connect the knuckle 254, 256 to thereby pivotably connect the arms 204, 206. An example implementation of the pivot joint 210 may comprise an upper knuckle 254 and a lower knuckle 255 fixedly connected to the first arm 204 and an intermediate knuckle 256 fixedly connected to the second arm 206 and disposed between the knuckles 254, 255. The pivot pin 258 may be or comprise a threaded bolt having a head on one side of the knuckles 254, 255, 256 and a nut threadedly engaging the pivot pin 258 on an opposing side of the knuckles 254, 255, 256.

The locking mechanism 250 may comprise a collar 260 (or ring) disposed in association with the pivot joint 210 and a protrusion 262 (e.g., an insert, a dog, a locking pin, a latch, etc.) disposed in association with the collar 260. The collar 260 may be connected to or otherwise carried by the pivot joint 210 or the first arm 204 and the protrusion 262 may be connected to or otherwise carried by the second arm 206. The collar 260 may have a generally ring-shaped (or annular) geometry. However, the collar 260 may have a partial ring-shaped geometry (i.e., a ring segment), whereby the collar 260 does not necessarily form a completely closed loop. The collar 260 may have a central axis 261 extending vertically when the carrier assembly 200 is connected to the vehicle. The central axis 261 of the collar 260 may extend coaxially with a central axis 259 of the pivot pin 258. The central axis 261 of the collar 260 may extend perpendicularly with respect to a central axis 267 of the protrusion 262.

The collar 260 may comprise one or more receptacles 264 each configured to accommodate (or receive) the protrusion 262. The protrusion 262 may be configured to be inserted into the receptacles 264 to lock the second arm 206 in the extended position. An example implementation of the locking mechanism 250 may comprise a first receptacle 264 configured to accommodate the protrusion 262 to lock the second arm 206 in the first extended position, a second receptacle 265 configured to accommodate the protrusion 262 to lock the second arm 206 in the second extended position, and a third receptacle 266 configured to accommodate the protrusion 262 to lock the second arm 206 in the third extended position.

The protrusion 262 may be directed toward and biased to move against (into contact with) the collar 260 such that the protrusion 262 can automatically enter (be inserted into) one of the receptacles 264, 265, 266 when the protrusion 262 is axially aligned with one of the receptacles 264, 265, 266. The locking mechanism 250 may therefore further comprise a biasing means 270 (e.g., a spring) operable to push, pull, or otherwise bias the protrusion 262 against the collar 260. The biasing means 270 may carry or otherwise connect the protrusion to the second arm 206. The collar 260 may further comprise a smooth outer surface 272 extending along a portion of the collar 260 on a side of or otherwise not comprising the receptacles 264, 265, 266. The protrusion 262 may be aligned with and biased against the smooth surface 272 when the second arm 206 is in the retracted position. When a human manually moves (or pivots) the second arm 206 from the retracted position to the extended position, the protrusion may be biased against and slide along the smooth surface 272. When the protrusion 262 reaches (is axially aligned with) the first receptacle 264, the protrusion 262 is biased toward the first receptacle 264 and automatically enters (is inserted into) the first receptacle 264 to lock the second arm 206 is in the first extended position. The protrusion 262 may comprise or be connected with a manual operator 263 (e.g., a handle, a hook, etc.) that can be manually pulled or otherwise manually operated by the human to manually move the protrusion 262 out of a receptacle 264, 265, 266 or otherwise away from the collar 260, such as to unlock the second arm 206 from a corresponding extended position and permit the second arm 206 to be manually pivoted to another extended position or to the retracted position. Accordingly, after a human manually operated the locking mechanism 230 to unlock the second arm 206 from the first arm 204, the locking mechanism 250 permits the human to manually move the second arm 206 from the retracted position to the first extended position by just manually pushing and/or pulling the second arm 206, without having to operate the manual operator 263 first.

The collar 260 may be detachably connected in association with the pivot joint 210 or the first arm 204. The collar 260 may extend around (or surround) at least a portion of the pivot joint 210 when the collar 260 is detachably connected to the pivot joint 210 or the first arm 204. For example, the collar 260 may be detachably connected to a portion of the pivot joint 210, such as the lower knuckle 255. The collar 260 may extend around at least a portion of the lower knuckle 255 when the collar 260 is detachably connected to the lower knuckle 255. The collar 260 may be detachably connected to the lower knuckle 255 by a plurality of fasteners 268 (e.g., threaded bolts, pins, etc.) extending through (or between) a portion of the lower knuckle 255 and the collar 260. The collar 260 may comprise an inner lip (obstructed from view by the lower knuckle 255) extending radially inward from an inner surface of the collar 260. The inner lip may be disposed against a lower surface of the lower knuckle 255 and the fasteners 268 may extend through the inner lip and the lower knuckle 255 to detachably connect the collar 260 to the lower knuckle 255.

Because the pivot joint defines or is located at the most outward portion of the carrier assembly 200 when the carrier assembly 200 is connected to the vehicle and the second arm is in the retracted position, the pivot joint 210 is especially susceptible to making contact with and being damaged (e.g., bent) by objects (e.g., trees, rocks, buildings, etc.) in the environment when the vehicle is driven. Because the collar 260 extends around the lower knuckle 255 and other portions of the pivot joint 210, the collar 260 may therefore operate as a guard configured to physically protect the lower knuckle 255 and other portions of the pivot joint 210 from physical damage caused by contact with the objects in the environment by preventing or inhibiting contact between the lower knuckle 255 and other portions of the pivot joint 210 and the objects in the environment. When the collar 260 contacts an object in the environment and is damaged (e.g., bent), the collar 260 may be detached (e.g., unbolted) with manual tools (e.g., a screwdriver, a wrench, etc.) from the pivot joint 210 and replaced by another collar 260.

Figure 14:
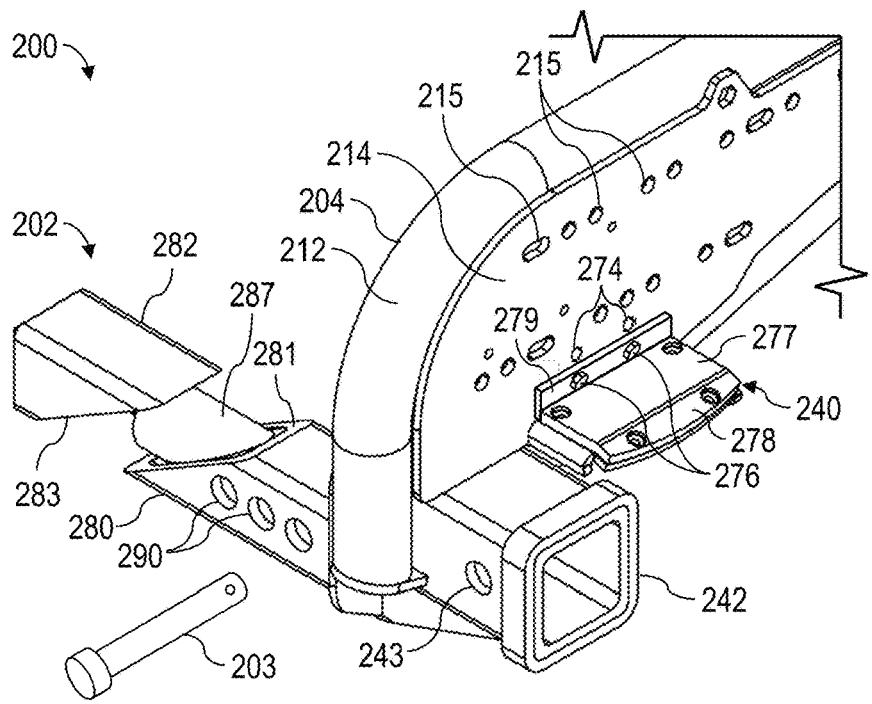
FIG. 14 is an enlarged perspective view of a portion of an example implementation of apparatus according to one or more aspects of the present disclosure.

FIG. 14 is an enlarged perspective view of a portion of the carrier assembly 200, including the support bracket 240 and the hitch connector 202. The following description refers to FIGS. 1-14, collectively.

As described above, the support bracket 240 may be connected to the first arm 204 and operable to support at least a portion of the weight of the second arm 206 and the objects 217 connected to the second arm 206 (e.g., via the mount 208) when the second arm 204 is in the retracted position. The support bracket 240 may be connected to or otherwise supported by the mounting surface 214 of the first arm 204 at a vertical position along the first arm 204 such that a structural member 216 or other portion of the second arm 206 contacts the support bracket 240. The vertical position of the support bracket 240 along the first arm 204 may be adjustable, such as to accommodate for changes in vertical position of the second arm 206. For example, portions of the second arm 206 away from the pivot joint 210 may sag (or bend) downward due to the weight of the second arm 206 and the objects 217 connected to the second arm 206. Accordingly, the vertical position of the support bracket 240 may be adjusted to accommodate (or compensate for) the sagging of the second arm 206 such that the support bracket 240 will not block or otherwise prevent the second arm 206 from being manually moved to the retracted position and the second arm 206 contacts the support bracket 240 when the second arm 206 is in the retracted position.

To facilitate adjustment of the vertical position of the support bracket 240 along the first arm 204, the support bracket 240 may be connectable to the first arm 204 at one of a plurality of different vertical positions along the first arm 204. For example, the mounting surface 214 of the first arm 204 may comprise a plurality of mounting bores 274 (or receptacles), each located at a different vertical position (or height) along the mounting surface 214 of the first arm 204. Each of the mounting bores 274 may facilitate connection of the support bracket 240 to the mounting surface 214 of the first arm 204 at a corresponding one of the different vertical positions (or heights). The mounting surface 214 of the first arm 204 may also or instead comprise a plurality of sets of mounting bores 274 (or receptacles), each set located at a different vertical position (or height) along the mounting surface 214 of the first arm 204. For example, a first plurality of mounting bores 274 may be located at a first vertical position, such that the first plurality of mounting bores 274 can facilitate connection of the support bracket 240 to the first arm 204 at the first (e.g., lowest) vertical position. A second plurality of mounting bores 274 may be located at a second vertical position, such that the second plurality of mounting bores 274 can facilitate connection of the support bracket 240 to the first arm 204 at the second (e.g., intermediate) vertical position. A third plurality of mounting bores 274 may be located at a third vertical position, such that the third plurality of mounting bores 274 can facilitate connection of the support bracket 240 to the first arm 204 at the third (e.g., highest) vertical position. FIG. 14 shows the support bracket 240 connected to the first arm 204 via the second plurality of bores 274, and also shows just the third plurality of mounting bores 274, with the first and second pluralities of bores being obstructed from view by the support bracket 240. The support bracket 240 may be detachably connected to the mounting surface 214 of the first arm 204 by one or more fasteners 276 (e.g., bolts) extending through (or between) the support bracket 240 and the mounting surface 214. The support bracket 240 may thus comprise one or more mounting bores (obstructed from view by the fasteners 276), each being configured to accommodate a corresponding fastener 276. Each of the mounting bores 274 may therefore also be configured to accommodate a corresponding fastener 276. Accordingly, the one or more mounting bores of the support bracket 240 and a selected one or more of the mounting bores 274 of the second arm 206 may be configured for receiving one or more of the fasteners 276 to detachably connect the support bracket 240 to the first arm 204 at a corresponding one of the different vertical positions.

The support bracket 240 may be or comprise one or more plates detachably connected to the first arm 204. For example, the support bracket 240 may comprise a first plate 277 configured to contact and support the second arm 206 when the second arm 206 is in the retracted position and a second plate 278 connected to the first plate 277 and extending laterally (e.g., diagonally) with respect to the first plate 277. When the human manually moves the second arm 206 from the extended position to the retracted position, a lower surface (or portion) of the second arm 206 may contact the second plate 278, which may lift or otherwise align the second arm 206 with the first plate 277 of the support bracket 240 such that the second arm 206 can be moved to the retracted position and be supported by the first plate 277 of the support bracket 240. The second plate 278 may thus be or comprise a strike plate. The support bracket 240 may comprise a third plate 279 connected to the first plate 277 opposite the second plate 278 and extending plate laterally (e.g., perpendicularly) with respect to the first plate 277. The third plate 279 may comprise the one or more mounting bores configured to receive the fasteners 276 for detachably connecting the support bracket 240 to the first arm 204. The third plate 279 may thus be or comprise a mounting plate (or bracket).

Figure 15:
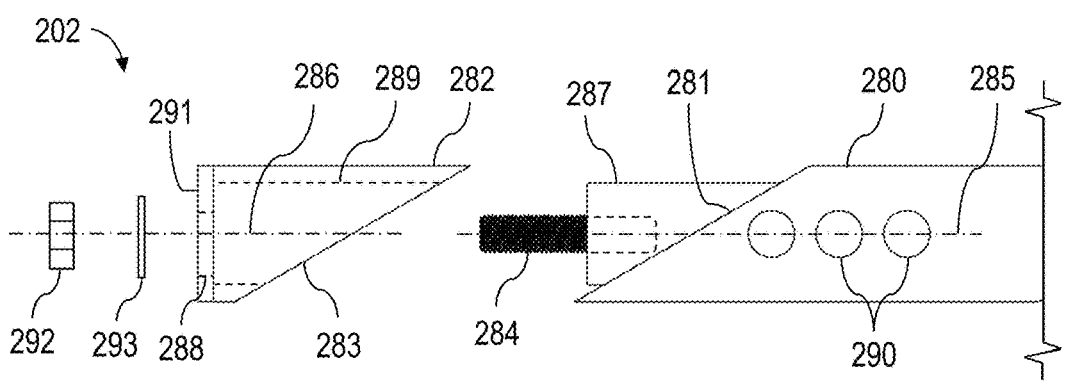
FIG. 15 is an exploded view of a portion of the apparatus shown in FIG. 14.
Figure 16:
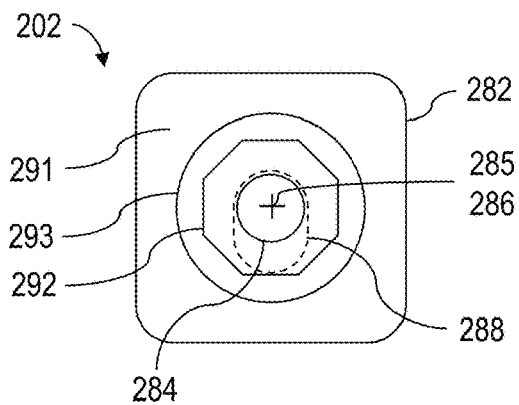
FIGS. 16 and 17 are axial views of a portion of the apparatus shown in FIGS. 14 and 15 in successive operational positions.
Figure 17:
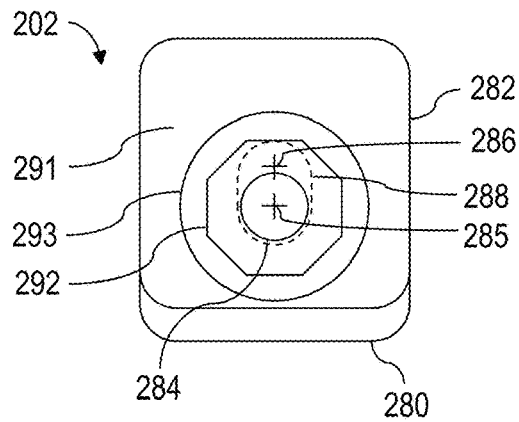

FIG. 15 is an exploded view of the hitch connector 202. FIGS. 16 and 17 are axial views of the hitch connector 202 during different stages of operation. The following description refers to FIGS. 1-17, collectively.

As described above, the hitch connector 202 may be operable for insertion into the hitch receiver of the vehicle and locked within the hitch receiver by the hitch receiver pin 203 to latch, lock, or otherwise retain the hitch connector 202 within the hitch receiver and, thus, detachably connect the carrier assembly 200 to the vehicle. The hitch connector 202 may comprise a bar 280 (or other structural member) and a wedge 282 disposed against each other and each configured to be collectively inserted into the hitch receiver of the vehicle. The bar 280 may be fixedly connected (e.g., welded, bolted, etc.) to the structural members 212 and/or the mounting surface 214 of the first arm 204. The bar 280 may comprise a diagonal surface 281 extending diagonally with respect to a longitudinal (e.g., central) axis 285 of the bar 280. A threaded rod 284 may be fixedly connected to the bar 280 and extend (e.g., axially) away from the bar 280 along the longitudinal axis 285. The threaded rod 284 may be fixedly connected to the bar 280 via an intermediate structural member 287 (e.g., a tube or cylinder) fixedly connected with and extending away from the bar 280 along the longitudinal axis 285. The bar 280 may also comprise one or more bores 290 (i.e., hitch pin holes or throughbores) extending through the bar perpendicularly with respect to the longitudinal axis 285. The wedge 282 may comprise a diagonal surface 283 extending diagonally with respect to a longitudinal (e.g., central) axis 286 of the wedge 282. The wedge 282 may be disposed adjacent (or against) the bar 280 such that the diagonal surface 281 is disposed against (or faces) the diagonal surface 283. The wedge 282 may comprise a cavity 289 configured to accommodate the intermediate structural member 287 and/or the threaded rod 284. The wedge 282 may comprise a bore 288 extending through a wall of the wedge 282 along the longitudinal axis 286 between a face (or front surface) 291 of the wedge 282 and the cavity 289. The bore 288 may comprise an oval profile extending asymmetrically with respect to the longitudinal axis 286. The threaded rod 284 may extend away from the diagonal surface 281 of the bar 280 along the longitudinal axis 285 and through the bore 288 of the wedge 282. The hitch connector 202 may further comprise a threaded member 292 (e.g., a threaded nut) configured to threadedly engage the threaded rod 284 extending out of the wedge 282 via the bore 288. A shim (or washer) 293 may be disposed about the threaded rod 284 between the threaded member 292 and the face 291 of the wedge 282.

The hitch connector 202 may be manually operated by a human between a retracted (or normal) position in which the wedge 282 and the bar 280 are axially aligned and configured to be collectively inserted into the hitch receiver, and an extended (or operated) position in which the wedge 282 is laterally (or radially) offset from the bar 280 and is forced against the inner surface of the hitch receiver and the diagonal surface 281 of the bar 280. An example retracted position of the hitch connector 202 is shown in FIG. 16 and an example extended position of the hitch connector 202 is shown in FIG. 17. The wedge 282 and the bar 280 may be axially aligned when the longitudinal axis 286 of the wedge 282 extends coaxially with the longitudinal axis 285 of the bar 280. Similarly, the wedge 282 may be laterally offset from the bar 280 when the longitudinal axis 286 of the wedge 282 is laterally offset from the longitudinal axis 285 of the bar 280. When the hitch connector 202 is in the retracted position, the hitch connector 202 may be inserted into a hitch receiver of the vehicle. Thereafter, the hitch pin 203 may be inserted through the hitch pin hole of the hitch receiver and through one of the bores 290 of the hitch connector 202 to lock the hitch connector 202 within the hitch receiver. The threaded member 292 may then be rotated to operate the hitch connector 202 to the extended position. The hitch connector 202 may be manually operated (i.e., the threaded member 292 may be manually rotated) to the extended position by a manual tool (e.g., a wrench and socket assembly) inserted into (or through) a rear-side opening of the hitch receiver (e.g., the rear-side opening 118 located opposite from the front-side opening 116 of the hitch receiver 112 through which the hitch connector 202 is inserted, as shown in FIG. 1), thereby permitting the hitch pin 203 to be inserted through the hitch pin hole of the hitch receiver and one of the hitch pin holes 290 of the hitch connector 202 before manually operating the hitch connector 202 from the retracted position to the extended position.

Upon rotation of the threaded member 292, during manual operations of the hitch connector 202, the threaded member 292 may move axially along the threaded rod 284 (and the longitudinal axis 285) forcing the wedge 282 to move (or slide) diagonally (i.e., axially and laterally) along the diagonal surface 281 or otherwise with respect to the bar 280. As the wedge 282 moves diagonally with respect to the bar 280, the bore 288 (and the longitudinal axis 286) may move laterally with respect to the threaded rod 284 (and the longitudinal axis 285). The wedge 282 may move diagonally with respect to the bar 280 until an upper surface of the wedge 282 pushes against (or contacts) an inner surface of the hitch receiver. In the extended position of the hitch connector 202, the wedge 282 may thus be wedged between the inner surface of the hitch receiver and the diagonal surface 280 of the bar 280 to prevent movement (e.g. wiggling, vibrations, etc.) between the hitch receiver and the bar 280 when the vehicle is being driven.

Although the hitch connector 202 is shown connected to the carrier assembly 200 and operable to facilitate a connection between the hitch receiver of the vehicle and the carrier assembly 200, it is to be understood that the hitch connector 202 may be implemented as a part of a different other vehicle accessory (including a different object carrier) and be operable to facilitate a connection between the hitch receiver of the vehicle and the other vehicle accessory. For example, the hitch connector 202 may be connected to the vehicle accessory 100 shown in FIG. 1. As described above, implementations of the vehicle accessory 100 may include, for example, a trailer, a wagon, a winch, a hitch tow bar, a ball hitch adapter, a shackle hitch adapter, a hitch receiver extension, a hitch receiver expander, and a hitch step.

The mounting holes 215, 219, 225 may each be physically configured (or shaped) as a dot or a dash extending into or through the corresponding mounting surfaces 214, 218, 223. Each of the mounting holes 215, 219, 225 configured as a dot may be or comprise a hole or cavity having a circular profile, and each mounting hole 215, 219, 225 configured as a dash may be or comprises a hole or cavity having an oval profile (e.g., an elongated hole, a slit, etc.). Each of the mounting holes 215, 219, 225 configured as a dot or a dash may be configured to accommodate the fasteners 213 for connecting the objects 217 to the carrier assembly 200.

The dots and dashes may be arranged in sequences (e.g., pluralities, series, etc.) of dots and dashes wherein each sequence of dots and dashes represents a letter of the alphabet (e.g., Latin alphabet, Greek alphabet, etc.). For example, each sequence of dots and dashes may represent a letter of the alphabet in Morse code. The mounting surfaces 214, 218, 223 may comprise a plurality (e.g., a series) of sequences of dots and dashes representing a plurality of letters of the alphabet forming a word, an acronym, a plurality of words, and/or a sentence. Accordingly, the sequences of dots and dashes may be customized or otherwise selected to facilitate visual communication with human pedestrians and human drivers of other vehicles looking at the carrier assembly 200 when the carrier assembly 200 is connected to the vehicle and the vehicle is being driven or parked. The sequences of dots and dashes may be used to advertise a product, such as the carrier assembly 200 and/or the manufacturer of the carrier assembly 200. For example, the visual communication may be indicative of the name or model of the carrier assembly 200 and/or the name and/or contact information of the manufacturer of the carrier assembly 200. The sequences of dots and dashes may also or instead be used to communicate personal messages of the owner of the vehicle. For example, the visual communications may be indicative of the name (or nickname) of the owner of the vehicle, location of residence of the owner of the vehicle, personal interests (or hobbies) of the owner of the vehicle, memberships of the owner of the vehicle, and/or endorsements by the owner of the vehicle.

As shown in FIGS. 2 and 3, the mounting holes 219 extending into or through the mounting surfaces 218 may be configured as a plurality of sequences of dots and dashes "- . . . ", "..- . . . .-", and "-.. -.-." representing the words (or acronyms) "TS", "USA", and "DC", respectively, in Morse code, and the mounting holes 225 extending into or through the mounting surface 223 may be configured as a plurality of sequences of dots and dashes "-.-. --- --" representing the word (or acronym) "COM" in Morse code. As shown in FIGS. 4 and 5, the mounting holes 215 extending into or through the mounting surfaces 214 may be configured as a plurality of sequences of dots and dashes "-.. -- .-. - -.-. --- --" and "..- . . . .-" representing the words (or acronyms) "DIRTCOM" and "USA", respectively, in Morse code.

Although the mounting holes 215, 219, 225 configured as sequences of dots and dashes representing letters of the alphabet are shown implemented on mounting surfaces 214, 218, 223 of the carrier assembly 200, it is to be understood that such mounting holes 215, 219, 225 configured as sequences of dots and dashes representing letters of the alphabet may be implemented as a part of or on other vehicle accessories. For example, the mounting holes 215, 219, 225 configured as sequences of dots and dashes representing letters of the alphabet may be implemented as a part of or on other vehicle accessory, such as the vehicle accessory 100 shown in FIG. 1. As described above, implementations of the vehicle accessory 100 may include, for example, a trailer, a wagon, a winch, a hitch tow bar, a ball hitch adapter, a shackle hitch adapter, a hitch receiver extension, a hitch receiver expander, and a hitch step.

Furthermore, although the sequences of dots and dashes representing letters of the alphabet are or operate as mounting holes 215, 219, 225, it is to be understood that such sequences of dots and dashes representing letters of the alphabet may not be or operate as mounting holes, but just to facilitate visual communication with human pedestrians and human drivers driving other vehicles looking at the carrier assembly 200 connected to the vehicle when the vehicle is driven or parked, as described above. Such sequences of dots and dashes representing letters of the alphabet may therefore be etched, painted, affixed, or otherwise imparted onto an outer surface (e.g., the structural members 212, 216, the mounting surfaces 214, 218, 223, etc.) of the carrier assembly 200 in a manner such that the sequences of dots and dashes cannot be used as mounting holes configured to accommodate the fasteners 213 for connecting the objects 217 to the carrier assembly 200. Such sequences of dots and dashes representing letters of the alphabet may be implemented on or as part of the carrier assembly 200 or as a part of or on other vehicle accessory, such as the vehicle accessory 100 shown in FIG. 1.

The present disclosure is therefore further directed to example methods (e.g., operations and/or processes) according to one or more aspects of the present disclosure. An example method may include facilitating visual communication with human pedestrians and human drivers of other vehicles. Such method may include imparting sequences of dots and dashes onto a vehicle accessory, wherein each sequence of dots and dashes represents a letter of the alphabet. The vehicle accessory may be configured for connection to the vehicle such that at least a portion of the vehicle accessory is located on an exterior of the vehicle, thereby permitting the human pedestrians and human drivers to view the sequences of dots and dashes when looking at the vehicle accessory connected to the vehicle. The sequences of dots and dashes representing letters of the alphabet may be implemented on or as part of the carrier assembly 200 or as a part of or on other vehicle accessory, such as the vehicle accessory 100 shown in FIG. 1. An example method may also include facilitating connection of the objects 217 to the vehicle accessory by imparting the sequences of dots and dashes onto the vehicle accessory such that each dot and each dash operates as a mounting hole (or cavity) 215, 219, 225 configured to accommodate a fastener 213 for connecting the objects 217 to the vehicle accessory. Imparting the sequences of dots and dashes onto the vehicle accessory may comprise cutting the dots and dashes into or through an outer surface of the vehicle accessory, punching the dots and dashes into or through an outer surface of the vehicle accessory, painting the dots and dashes on an outer surface of the vehicle accessory, etching the dots and dashes onto an outer surface of the vehicle accessory, and/or affixing the dots and dashes onto an outer surface of the vehicle accessory.

In view of the entirety of present disclosure, including the figures and the claims, a person having ordinary skill in the art will readily recognize that the present disclosure introduces a hitch connector assembly operable to be inserted into a vehicle hitch receiver. The hitch connector assembly includes a bar having a first diagonal surface, a wedge having a second diagonal surface, a threaded rod extending away from the bar and through the wedge, and a threaded member configured to threadedly engage the threaded rod. The wedge is disposed adjacent the bar such that the first diagonal surface is disposed against the second diagonal surface. Upon rotation of the threaded member, the threaded member moves axially along the threaded rod forcing the wedge to slide diagonally along the bar.

The threaded member may be or comprise a threaded nut. The threaded rod may be fixedly connected with respect to the bar. The threaded rod may extend away from the first diagonal surface. The threaded rod may extend out of the wedge. The wedge may comprise a bore having an oval profile and the threaded rod may extend through the bore. The threaded rod may extend along a longitudinal axis of the bar, the bar may comprise a bore extending perpendicularly with respect to the longitudinal axis, and the bore may be configured to receive a hitch pin. The first diagonal surface may extend diagonally with respect to a longitudinal axis of the bar and the threaded rod may extend along the longitudinal axis of the bar. A vehicle accessory may be connected with the hitch connector assembly and the hitch connector assembly may be operable to connect the vehicle accessory to the vehicle hitch receiver. The vehicle accessory may be or comprise a carrier assembly for carrying an object.

The present disclosure also introduces a carrier assembly for connecting an object to a vehicle. The carrier assembly includes a hitch connector operable to be inserted into a hitch receiver of the vehicle, a first arm, a second arm pivotably connected to the first arm, and a support bracket connected to the first arm. The second arm is operable to move between a retracted position in which the second arm is disposed against the first arm and an extended position in which the second arm is disposed away from the first arm. The support bracket is configured to contact the second arm when the second arm is in the retracted position to thereby support at least a portion of the weight of the second arm and the object when the object is connected to the carrier assembly. A vertical position of the support bracket along the first arm is adjustable.

The first arm may comprise a plurality of bores each at a different vertical position along the first arm and each of the bores may facilitate connection of the support bracket to the first arm at a corresponding one of the different vertical positions. The first arm may comprise a first plurality of bores at a first vertical position and a second set of bores at a second vertical position. The first plurality of bores may facilitate connection of the support bracket to the first arm at the first vertical position and the second set of bores may facilitate connection of the support bracket to the first arm at the second vertical position. The support bracket may be connectable to the first arm at one of a plurality of different vertical positions along the first arm. The support bracket may be or comprise a plate. The support bracket may comprise a first plate configured to contact the second arm when the second arm is in the retracted position and a second plate connected to the first plate and extending diagonally with respect to the first plate. The support bracket may further comprise a third plate connected to the first plate opposite the second plate, wherein the third plate may comprise a bore configured to receive a connector for connecting the support bracket to the first arm. The support bracket may comprise a first bore, the first arm may comprise a plurality of second bores each at a different vertical position along the first arm, and the first bore and a selected one of the second bores may be configured for receiving a connector to connect the support bracket to the first arm at a corresponding one of the different vertical positions.

The present disclosure also introduces a carrier assembly for connecting an object to a vehicle. The carrier assembly includes a hitch connector operable to be inserted into a hitch receiver of the vehicle, a first arm, a second arm, and a pivot joint pivotably connecting the second arm to the first arm. The pivot joint facilitates movement of the second arm between a retracted position in which the second arm is disposed against the first arm and an extended position in which the second arm is disposed at an angle with respect to the first arm. The pivot joint includes a first knuckle connected to the first arm, a second knuckle connected to the second arm, and a pin extending through the first knuckle and the second knuckle to pivotably connect the first knuckle and the second knuckle. The carrier assembly also includes a collar disposed in association with the pivot joint, wherein the collar comprises a receptacle, and a protrusion disposed in association with the collar, wherein the protrusion is configured to be inserted into the receptacle to lock the second arm in the extended position.

The collar may extend around a portion of the pivot joint. The collar may detachably connected in association with the pivot joint. The collar may be detachably connected to the pivot joint. The collar may be detachably connected to the first knuckle. The extended position may be a first extended position, the angle may be a first angle, the receptacle may be a first receptacle, the pivot joint may also facilitate movement of the second arm between the retracted position and a second extended position in which the second arm is disposed at a second angle with respect to the first arm, the collar may comprise a second receptacle, and the protrusion may also be configured to be inserted into the second receptacle to lock the second arm in the second extended position. The collar may further comprises a smooth surface, the protrusion may be aligned with and biased against the smooth surface when the second arm is in the retracted position, the protrusion may be biased against and slide along the smooth surface when the second arm is being moved from the retracted position to the extended position, and the protrusion may be aligned with and biased toward the receptacle when the second arm is in the extended position such that the protrusion is inserted into the receptacle. The collar may have a central axis extending vertically when the carrier assembly is connected to the vehicle. The collar may have a collar central axis, the pin may have a pin central axis, and the collar central axis and the pin central axis may be coaxial. The collar may have a collar central axis, the protrusion may have a protrusion central axis, and the collar central axis and the protrusion central axis may extend perpendicularly with respect to each other. The collar may be carried by the first arm and the protrusion may be carried by the second arm. The carrier assembly may further comprise a biasing member operable to bias the protrusion into contact with the collar.

The present disclosure also introduces a method for facilitating visual communication with human pedestrians and human drivers. The method includes imparting sequences of dots and dashes onto a vehicle accessory that is configured for connection to a vehicle such that at least a portion of the vehicle accessory is located on an exterior of the vehicle thereby permitting the human pedestrians and human drivers to view the sequences of dots and dashes when looking at the vehicle accessory connected to the vehicle. Each sequence of dots and dashes represents a letter of the alphabet.

Each sequence of dots and dashes may represent a letter of the alphabet in Morse code. The method may further comprise facilitating connection of an object to the vehicle accessory by imparting the sequences of dots and dashes onto the vehicle accessory such that each dot and each dash is configured to accommodate a fastener for connecting the object to the vehicle accessory. Each dot may comprise a bore having a circular profile and each dash may comprise a bore having an oval profile. The vehicle accessory may comprise a hitch connector configured to be inserted into a hitch receiver of the vehicle to thereby connect the vehicle accessory to the vehicle. The vehicle accessory may be or comprise a swing-out carrier assembly configured to carry an object. Imparting the sequences of dots and dashes onto the vehicle accessory may comprise cutting the dots and dashes into an outer surface of the vehicle accessory. Imparting the sequences of dots and dashes onto the vehicle accessory may comprise punching the dots and dashes into an outer surface of the vehicle accessory. Imparting the sequences of dots and dashes onto the vehicle accessory may comprise painting the dots and dashes on an outer surface of the vehicle accessory. Imparting the sequences of dots and dashes onto the vehicle accessory may comprise etching the dots and dashes on an outer surface of the vehicle accessory.

The present disclosure also introduces a vehicle accessory that is configured for connection to a vehicle. The vehicle accessory includes a plurality of sequences of dots and dashes, each dot is or comprises a hole or cavity having a circular profile, each dash is or comprises a hole or cavity having an oval profile, each dot and each dash is configured to accommodate a fastener, and each sequence of dots and dashes represents a letter of the alphabet.

Each sequence of dots and dashes may represent a letter of the alphabet in Morse code. One or more of the dots and dashes may facilitate connection of an object to the vehicle accessory via the fastener. One or more of the sequences of dots and dashes may extend into or through a mounting plate of the vehicle accessory. The sequences of dots and dashes may facilitate visual communication with human pedestrians and human drivers looking at the vehicle accessory when connected to the vehicle. The vehicle accessory may comprise a hitch connector configured to be inserted into a hitch receiver of the vehicle to thereby facilitate connection of the vehicle accessory to the vehicle. The vehicle accessory may be or comprise a swing-out carrier assembly configured to carry an object.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:
1. An apparatus comprising:
   a carrier assembly for connecting an object to a vehicle, wherein the carrier assembly comprises:
      a hitch connector operable to be inserted into a hitch receiver of the vehicle;
      a first arm;
      a second arm pivotably connected to the first arm, wherein the second arm is operable to move between a retracted position in which the second arm is disposed against the first arm and an extended position in which the second arm is disposed away from the first arm; and a support bracket connected to the first arm, wherein the support bracket is configured to contact the second arm when the second arm is in the retracted position to thereby support at least a portion of the weight of the second arm and the object when the object is connected to the carrier assembly, and wherein a vertical position of the support bracket along the first arm is adjustable.

2. The apparatus of claim 1 wherein the first arm comprises a plurality of bores each at a different vertical position along the first arm, and wherein each of the bores facilitates connection of the support bracket to the first arm at a corresponding one of the different vertical positions.

3. The apparatus of claim 1 wherein the first arm comprises:

a first plurality of bores at a first vertical position, wherein the first plurality of bores facilitates connection of the support bracket to the first arm at the first vertical position; and a second set of bores at a second vertical position, wherein the second set of bores facilitates connection of the support bracket to the first arm at the second vertical position.

4. The apparatus of claim 1 wherein the support bracket is connectable to the first arm at one of a plurality of different vertical positions along the first arm.

5. The apparatus of claim 1 wherein the support bracket is or comprises a plate.

6. The apparatus of claim 1 wherein the support bracket comprises:

a first plate configured to contact the second arm when the second arm is in the retracted position; and a second plate connected to the first plate and extending diagonally with respect to the first plate.

7. The apparatus of claim 6 wherein the support bracket further comprises a third plate connected to the first plate opposite the second plate, and wherein the third plate comprises a bore configured to receive a connector for connecting the support bracket to the first arm.

8. The apparatus of claim 1 wherein:

the support bracket comprises a first bore;

the first arm comprises a plurality of second bores each at a different vertical position along the first arm; and the first bore and a selected one of the second bores are configured for receiving a connector to connect the support bracket to the first arm at a corresponding one of the different vertical positions.

* * * * *